US009164665B2

(12) United States Patent  
Kobayashi et al.

(10) Patent No.: US 9,164,665 B2  
(45) Date of Patent: Oct. 20, 2015

(54) OUTPUTTING MANAGEMENT INFORMATION BASED ON STATE OF MANAGED OBJECT

(71) Applicant: INTERNATIONAL BUSINESS MACHINES CORPORATION, Armonk, NY (US)

(72) Inventors: Takumi Kobayashi, Yamato (JP); Shigeko Mori, Yamato (JP); Tatsuyuki Shiomi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 14/059,927

(22) Filed: Oct. 22, 2013

(65) Prior Publication Data

US 2014/0181727 A1    Jun. 26, 2014

(30) Foreign Application Priority Data

Dec. 25, 2012 (JP) ................................ 2012-281780

(51) Int. Cl.
*G06F 3/0484* (2013.01)

(52) U.S. Cl.
CPC ..................... *G06F 3/0484* (2013.01)

(58) Field of Classification Search
CPC .................................................... G06F 3/0484
USPC ........................................................ 715/784
See application file for complete search history.

(56) References Cited

U.S. PATENT DOCUMENTS

| | | | | |
|---|---|---|---|---|
| 6,668,045 | B1* | 12/2003 | Mow | 379/88.19 |
| 7,492,881 | B1* | 2/2009 | Hite et al. | 379/114.23 |
| 2013/0232430 | A1* | 9/2013 | Reitan | 715/765 |
| 2014/0310622 | A1* | 10/2014 | Bump et al. | 715/762 |
| 2015/0052443 | A1* | 2/2015 | Funase | 715/736 |
| 2015/0074750 | A1* | 3/2015 | Pearcy et al. | 726/1 |

FOREIGN PATENT DOCUMENTS

| | | |
|---|---|---|
| JP | 2003216238 | 7/2003 |
| JP | 2006031213 | 2/2006 |
| JP | 2012059063 | 3/2012 |
| WO | 03105039 A1 | 12/2003 |

* cited by examiner

*Primary Examiner* — David Phantana Angkool
(74) *Attorney, Agent, or Firm* — Law Office of Jim Boice

(57) ABSTRACT

A hardware device outputs management information relating to an event that occurs in a managed object. A management information processing unit generates charts for displaying the management information relating to the event. A management screen editing unit generates a management screen for managing a state of the managed object using the charts generated by the management information processing unit. The management screen editing unit further sets a significance of each of the charts generated; generates a first management screen for selecting one of a plurality of chart groups relating to the event that occurs in the managed object; generates a second management screen for displaying a chart group selected in the first management screen; and provides a special display for a particular chart group that includes a chart whose significance is higher than a predetermined threshold, in order to distinguish the particular chart group from other chart groups.

15 Claims, 10 Drawing Sheets

|  | $D_1$ | $D_2$ | $D_3$ | $D_4$ | $D_5$ | ... | $D_n$ |
|---|---|---|---|---|---|---|---|
| $r_1$ | 1.0 | 0 | 0 | 0 | 0 | ... | 0 |
| $r_2$ | 0 | 1.0 | 0 | 0 | 0 | ... | 0 |
| $r_3$ | 0 | 0 | 0.5 | 0.5 | 0 | ... | 0 |
| $r_4$ | 0 | 0.5 | 0 | 0.25 | 0.25 | ... | 0 |
| ⋮ | ⋮ | ⋮ | ⋮ | ⋮ | ⋮ |  | ⋮ |
| $r_m$ | 0 | 0 | 0 | 0 | 0 | ... | 1.0 |

FIG. 2

OUTPUTTING MANAGEMENT INFORMATION BASED ON STATE OF MANAGED OBJECT

This application is based on and claims the benefit of priority from Japan (JP) Patent Application 2012-281780, filed on Dec. 25, 2012, and herein incorporated by reference in its entirety.

BACKGROUND

The present invention relates to a device, a method, and a program for managing states of resources of various managed objects and, in the case where a predetermined event occurs, outputting management information relating to the event that occurs.

A conventional management system manages states of resources of various systems such as a database. This type of management system assumes possible events in a system which is a managed object and, in the case where a predetermined event occurs, presents information (management information) relating to the event, thus aiding an administrator of the managed object system in analyzing and handling the event.

For example, in one known technique, a list of data relating to possible trouble events in a managed device, a list of data relating to criteria for specifying causes of such events, and a list of data relating to handling procedures set according to the causes of the trouble events are stored in association with each other.

Moreover, in another conventional technique, all log data relating to an event are acquired and, if a change of certain log data per unit time exceeds a predetermined threshold, the remaining log data are selected and the selected log data are displayed in graph form.

SUMMARY

In one embodiment of the present invention, a hardware device outputs management information relating to an event that occurs in a managed object. A management information processing unit generates, based on the event that occurs in the managed object, charts for displaying the management information relating to the event. A management screen editing unit generates a management screen for managing a state of the managed object using the charts generated by the management information processing unit. A display control unit displays the management screen, generated by the management screen editing unit, on a display device. The management screen editing unit: sets significance of each of the charts generated by the management information processing unit, based on weight information of the management information referenced to for determining an occurrence of the event, the weight information being weight information of the management information; generates at least a first management screen for selecting one of a plurality of chart groups relating to the event that occurs in the managed object; generates a second management screen for displaying a chart group selected in the first management screen; and provides, in the first management screen, a special display for a particular chart group that includes a chart whose significance is higher than a predetermined threshold, to distinguish the particular chart group from other chart groups.

In one embodiment of the present invention, a hardware device outputs management information relating to an event that occurs in a managed object. A management information processing unit generates, based on the event that occurs in the managed object, charts for displaying the management information relating to the event. A holding unit for holding relevance definition information defines relevance between the charts generated by the management information processing unit. A management screen editing unit generates a management screen for managing a state of the managed object using the charts generated by the management information processing unit. A display control unit displays the management screen generated by the management screen editing unit, on a display device. The management screen editing unit: sets significance of each of the charts generated by the management information processing unit, based on weight information of the management information referenced to for determining an occurrence of the event, the weight information being weight information of the management information; generates a first management screen, a second management screen, and a third management screen, the first management screen being a screen in which a guidance image for selecting one of a plurality of chart groups relating to the event that occurs in the managed object is included and in which a chart whose significance is highest of charts belonging to the chart group is displayed as the guidance image, the second management screen being a screen for displaying the chart group selected in the first management screen, and the third management screen being a screen for displaying, in a larger display size, a chart selected in the second management screen and displaying, in a smaller display size, one or more charts relevant to the chart based on the relevance definition information; performs, in the first management screen, a first special display for a chart group that includes a chart whose significance is higher than a predetermined threshold, to distinguish the chart group from other chart groups; and performs a second special display for a chart, from among charts included in the chart group displayed in the second management screen, to which one or more charts are relevant based on the relevance definition information, to distinguish the chart from other charts.

In one embodiment of the present invention, a computer program product causes a computer to output management information relating to an event that occurs in a managed object. The computer program product comprises a computer readable storage medium having program code embodied therewith, the program code readable and executable by a processor to perform a method comprising: generating, based on the event that occurs in the managed object, charts for displaying the management information relating to the event, according to predetermined definition information; setting significance of each of the charts generated in the step of generating the charts, based on weight information of the management information referenced to for determining an occurrence of the event, the weight information being weight information of the management information; generating a first management screen for selecting one of a plurality of chart groups relating to the event that occurs in the managed object, the first management screen being a screen in which a special display is added to distinguish a chart group out of the plurality of chart groups that includes a chart whose significance set in the step of setting the significance is higher than a predetermined threshold, from other chart groups; and generating a second management screen for displaying the chart group selected in the first management screen.

BRIEF DESCRIPTION OF THE SEVERAL VIEWS OF THE DRAWINGS

FIG. 2 is a chart showing weighting of data elements in each determination rule;

DETAILED DESCRIPTION

The following describes an embodiment of the present invention in detail, with reference to attached drawings. Note that one or more of the features presented herein as "exemplary" are features that are found in one or more embodiments of the present invention.

Exemplary System Structure

Figure 1:
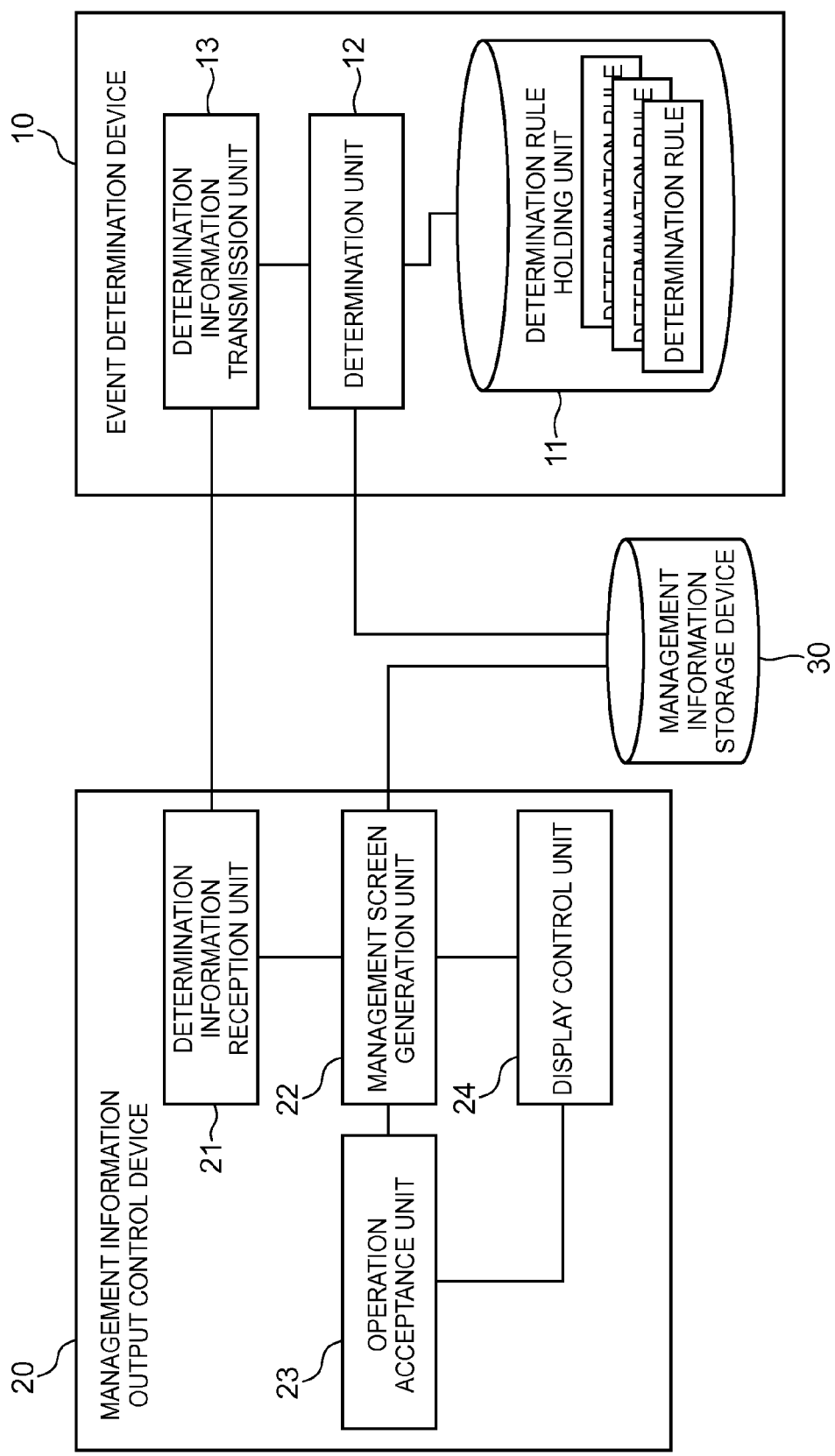
FIG. 1 is a diagram showing an example of a structure of a management system to which an embodiment is applied.

FIG. 1 is a diagram showing an example of a structure of a management system to which this embodiment is applied. The management system shown in FIG. 1 includes: an event determination device 10 for monitoring states of resources of a managed object and determining whether or not a specific event (e.g. Exception) occurs; and a management information output control device 20 for outputting information according to the determination by the event determination device 10. The management system also includes a management information storage device 30 for acquiring and storing management information which is information relating to the states of the resources of the managed object. The managed object of the management system in this embodiment may be not only any of various information systems such as a computer system and a network system, but also any of a wide variety of other systems capable of expressing, as statistical data, states of elements used as resources.

For example, the management system in this embodiment sets, for such a managed system, each rule (determination rule described later) for making some kind of determination using management information which is statistical data expressing the states of the resources and, in the case of an occurrence of an event determined based on the rule, detects the event. The management system then provides information content used for checking the original management information (statistical data) relating to the detected event. The event to be detected can be appropriately set depending on the managed system. Any event for which a determination rule for making some kind of determination relating to the states of the resources of the managed system can be set may actually be used.

Exemplary Functional Structure of Event Determination Device

In the management system shown in FIG. 1, the event determination device 10 includes a determination rule holding unit 11, a determination unit 12, and a determination information transmission unit 13. The event determination device 10 is connected to the management information storage device 30 via connection means such as a network.

The determination rule holding unit 11 holds each determination rule which is a rule for determining whether or not a specific event occurs based on a change in the states of the resources. Each determination rule is set, for example, as a criterion formula using one or more data elements (variables indicating statistical values) which are information indicating the states of the resources. As the criterion formula, a criterion formula in existing statistical processing such as threshold determination may be used as appropriate. In this embodiment, the data elements used in each determination rule are given numerical values expressing "weights" in the determination rule. Each data element is thus weighted.

FIG. 2 is a chart showing the weighting of the data elements in each determination rule. In the chart shown in FIG. 2, for each determination rule $r_j$ (j: $1 \leq j \leq m$), each data element $D_i$ (i: $1 \leq i \leq n$) used in the determination rule $r_j$ and its "weight" are shown as an example. For instance, in the example shown in FIG. 2, the determination by the determination rule $r_1$ is the determination using only the data element $D_1$. The determination by the determination rule $r_3$ is the determination using the data elements $D_3$ and $D_4$ with the same weight. The determination by the determination rule $r_4$ is the determination using the data elements $D_2$, $D_4$, and $D_5$ with the weights at the ratio of 2:1:1.

The determination unit 12 acquires a data element as management information from the management information storage device 30 and, using the acquired data element and each determination rule held in the determination rule holding unit 11, determines whether or not an event subjected to the determination by the determination rule occurs. For example, in the case where each determination rule is set as shown in FIG. 2, the determination unit 12, upon acquiring a value for the data element $D_2$ from the management information storage device 30, makes the determination by the determination rule $r_2$ and the determination by the determination rule $r_4$ for the value of the data element $D_2$. The acquisition of data element values and determination process by the determination unit 12 is performed, for example, on a regular basis. Regarding a determination rule using a plurality of data elements such as the determination rule $r_4$, whether the determination is possible with only part of the data element values (e.g. the value for the data element $D_2$ in this case) or the determination is impossible unless all data element values are acquired depends on the criterion formula using, for example, a Boolean expression.

The determination by the determination unit 12 is described in more detail below. Consider the case where the determination by the determination rule $r_1$ shown in FIG. 2 is threshold determination, as an example. In this case, for example when the value of the data element $D_1$ acquired from the management information storage device 30 exceeds a threshold set in the determination rule $r_1$, the determination unit 12 determines that an event to be detected in the determination by the determination rule $r_1$ occurs.

The event detected as the result of determination by the determination unit 12 is assigned "severity" as additional information indicating its influence in the managed system. This "severity" information is set in several levels (e.g. about three to four levels), and assigned to the detected event.

In this embodiment, the determination unit 12 also sets "contribution" with regard to the detected event, as additional information indicating the influence of each data element in the determination rule used for detecting the event. The above-mentioned "severity" information is reflected in the "contribution" information. In other words, the contribution (hereafter referred to as "rule-specific contribution") of each data element in the determination rule is weighted according to the severity of the event detected in the determination by the determination rule. In the example shown in FIG. 2, the rule-specific contribution $c_{i,j}$ of the data element $D_i$ in the determination rule $r_j$ is computed, for instance, according to the following equation $$c_{i,j} = W(S_j) \times W_{i,j}$$

where $W_{i,j}$ denotes the weight of the data element $D_i$ in the determination rule $r_j$, $S_j$ denotes the severity of the event detected in the determination by the determination rule $r_j$, and $W(S_j)$ denotes the weighting value.

The determination information transmission unit 13 transmits determination information including the result of determination by the determination unit 12, to the management information output control device 20. The determination information transmitted from the determination information transmission unit 13 includes, for example, information for notifying the detected event (e.g. the name and description of the event) and the severity of the event. The determination information also includes the identification information, values, and rule-specific contribution of the data elements used in the determination of the occurrence of the event (i.e. the data elements evaluated in the criterion formula).

Exemplary Functional Structure of Management Information Output Control Device

In the management system shown in FIG. 1, the management information output control device 20 includes a determination information reception unit 21, a management screen generation unit 22, an operation acceptance unit 23, and a display control unit 24. The management information output control device 20 is connected to the management information storage device 30 via connection means such as a network.

The determination information reception unit 21 receives the determination information transmitted from the event determination device 10, and passes the received determination information to the management screen generation unit 22. The communication between the determination information reception unit 21 and the determination information transmission unit 13 in the event determination device 10 may be push-type communication initiated by the determination information transmission unit 13, or pull-type communication where the determination information reception unit 21 requests transmission.

The management screen generation unit 22 acquires the information (management information) indicating the states of the resources from the management information storage device 30, and generates a management screen to be presented to the administrator using the acquired management information and the determination information acquired from the event determination device 10. The management screen includes a notification screen for notifying the occurrence of the event, an analysis screen used to analyze the states of the resources relating to the event that occurs, and the like. The management screen generation unit 22 generates a dashboard management screen in which these individual screens are arranged. To generate this management screen, the management screen generation unit 22 processes the management information acquired from the management information storage device 30, and edits the screen based on the determination information acquired from the event determination device 10. The function and process of the management screen generation unit 22 will be described in detail later.

The operation acceptance unit 23 accepts an operation performed on the management screen by the administrator using an input device such as a keyboard and a mouse. For example, the operation acceptance unit 23 accepts an operation of instructing the management screen generation unit 22 to generate a management screen of a specific structure, an operation of selecting, from a list of analysis screens displayed in the management screen, an analysis screen which the administrator wants to enlarge in order to reference to the details.

The display control unit 24 displays the management screen generated by the management screen generation unit 22, on a display device such as a liquid crystal display. The display control unit 24 also switches the display of the management screen according to the operation accepted by the operation acceptance unit 23.

Exemplary Functional Structure of Management Screen Generation Unit

Figure 3:
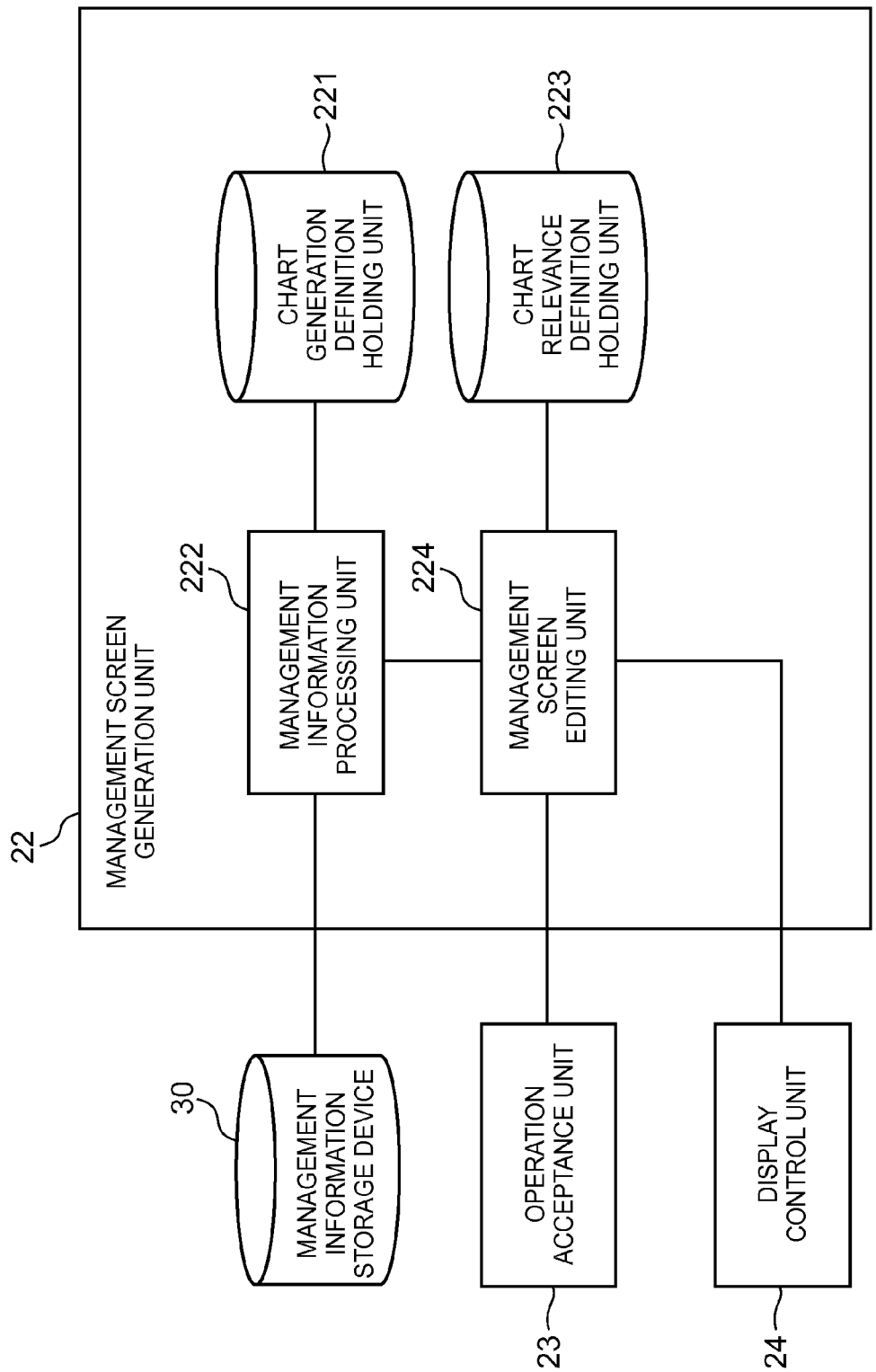
FIG. 3 is a diagram showing an example of a functional structure of a management screen generation unit.

FIG. 3 is a diagram showing an example of a functional structure of the management screen generation unit 22. As shown in FIG. 3, the management screen generation unit 22 in this embodiment includes a chart generation definition holding unit 221, a management information processing unit 222, a chart relevance definition holding unit 223, and a management screen editing unit 224.

The chart generation definition holding unit 221 holds definition information relating to the processing of the management information for generating the analysis screen in the management screen. As the analysis screen, various graphs and tables (hereafter referred to as "charts") are used as appropriate, for the analysis of the management information. That is, the management information is processed to the chart form used as the analysis screen. The type of management information employed in each chart used as the analysis screen is defined in the definition information held in the chart generation definition holding unit 221. In other words, which management information (data element values) is displayed in which chart is defined. Note that the number of types of management information displayed in one chart is not limited to one, as a chart including a plurality of types of management information is available (e.g. a chart indicating correlations of a plurality of types of management information).

The management information processing unit 222 generates each chart as the analysis screen using the data element values acquired from the management information storage device 30, based on the definition information held in the chart generation definition holding unit 221.

The chart relevance definition holding unit 223 holds definition information indicating the relevance between the charts generated by the management information processing unit 222. In this embodiment, each chart is expressed as a node, and the relevance between two charts v and w is defined as an edge having nodes v and w at both ends. The relevance between the charts is thus expressed as an undirected graph (V, E) made up of a node group V and an edge set E. Though the relevance between the charts is expressed as an undirected graph, the charts as a whole are ordered based on an appropriate rule.

Figure 4:
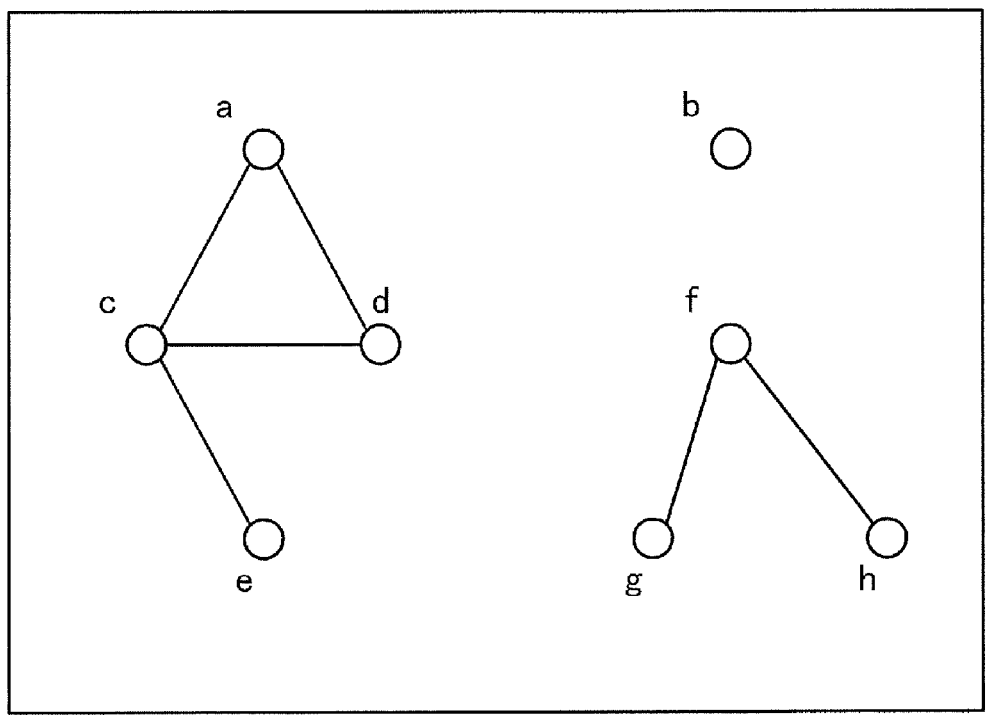
FIG. 4 is a diagram showing an example of expressing definition information held in a chart relevance definition holding unit by undirected graphs.

FIG. 4 is a diagram showing an example where the definition information held in the chart relevance definition holding unit 223 is expressed by the above-mentioned undirected graphs (V, E). In the definition information shown in FIG. 4, the eight nodes a to h express eight charts, and the edges between the nodes express the relevance between the charts. In the example shown in FIG. 4, for instance, the three charts expressed by the nodes a, c, and d are relevant to each other, and the chart expressed by the node c is also relevant to the chart expressed by the node e. Meanwhile, the chart expressed by the node b is not relevant to any other chart. The chart expressed by the node f is relevant to the chart expressed by the node g and the chart expressed by the node h, but the chart expressed by the node g and the chart expressed by the node h are not relevant to each other. Thus, the undirected graph (V, E) including the four nodes a, c, d, and e, the undirected graph (V, E) including only the single node b, and the undirected graph (V, E) including the three nodes f, g, and h are shown in the example in FIG. 4.

The relevance between the charts can be set based on various criteria. Charts including the same type of management information (data elements) as the display object are typically relevant to each other. However, the relevance between the charts may be set regardless of which management information is displayed. Moreover, the history of the chart reference procedure by a skilled administrator may be recorded so that the relevance between the charts is set or the already set relevance between the charts is changed (improved) based on the reference procedure.

The management screen editing unit 224 edits the management screen, based on the charts generated by the management information processing unit 222 and the definition information held in the chart relevance definition holding unit 223. In detail, the management screen editing unit 224 first ranks each chart based on the contribution of the data element displayed in the chart to the chart (not the above-mentioned rule-specific contribution but the contribution in all determination rules by which the data element is evaluated, hereafter referred to as "chart-specific contribution"). The management screen editing unit 224 then generates a management screen in which each chart is arranged based on the result of ranking. The management screen editing unit 224 also adds, to a highly ranked chart, a special display indicating that the chart is significant in analyzing the event. These processes are described in detail below.

Exemplary Chart Ranking Process

The chart ranking process is described first. In this embodiment, each chart relating to the event indicated in the determination information is ranked through the evaluation that additionally concerns whether or not a data element included in the determination information is referenced to by the chart and what extent of severity the event detected from the data element has.

First, the management screen editing unit 224 computes, for each data element $D_i$ included in the determination information acquired from the event determination device 10, the chart-specific contribution $c_i$ which is the contribution to the chart in which the data element $D_i$ is displayed, according to the following equation. Note that the rule-specific contribution $c_{i,j}$ of the data element $D_i$ in the determination rule $r_j$ is included in the acquired determination information.

$$c_i = \Sigma_j c_{i,j}.$$

Next, the management screen editing unit 224 computes the "significance" of each chart, based on the chart-specific contribution $c_i$ of every data element $D_i$ referenced to in the chart of the analysis screen. In detail, the value obtained by computing the arithmetic mean of the chart-specific contributions $c_i$ of the data elements whose chart-specific contributions $c_i$ are each not 0 from among the data elements referenced to in the chart is set as the significance of the chart.

The management screen editing unit 224 then assigns, to each node of the undirected graph (V, E) generated from the definition information held in the chart relevance definition holding unit 223 and expressing the relevance between the charts, the value of the significance computed for the chart corresponding to the node in the above-mentioned manner. The management screen editing unit 224 also sets, for each edge of the undirected graph (V, E), the "direction" from the node higher in significance (higher-significance node) to the node lower in significance (lower-significance node), thereby generating a directed graph.

Figure 5:
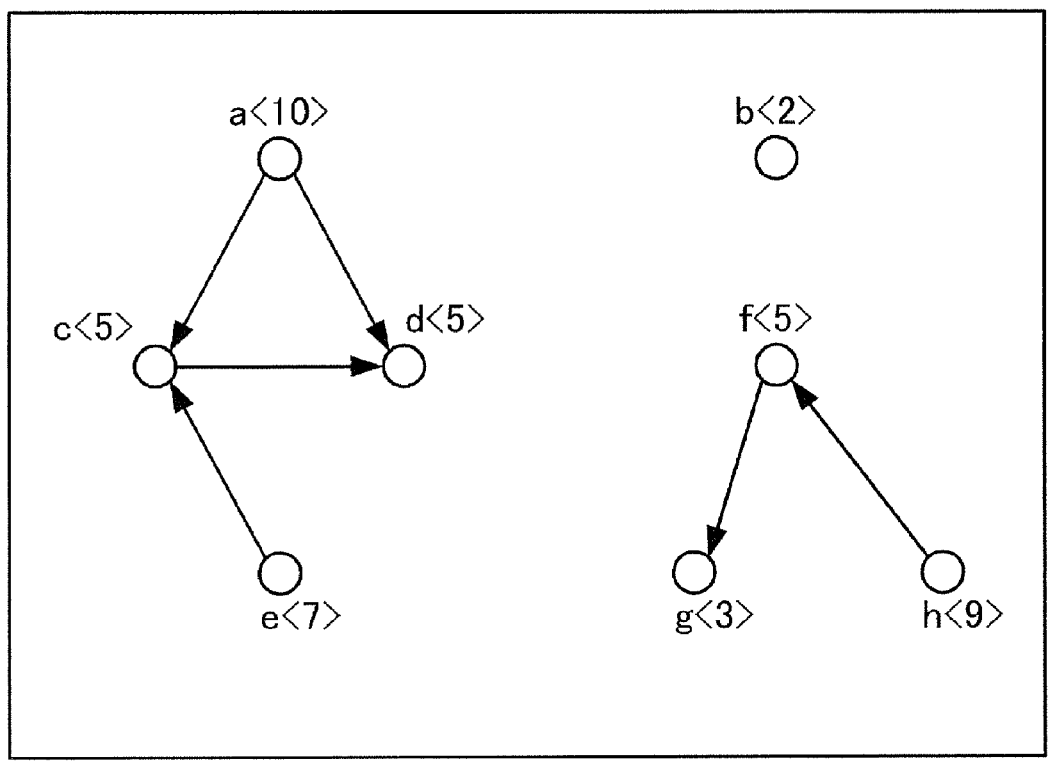
FIG. 5 is a diagram showing an example of directed graphs generated using the undirected graphs that express the chart relevance shown in FIG. 4.

FIG. 5 is a diagram showing an example of the directed graphs generated using the undirected graphs (V, E) expressing the relevance between the charts shown in FIG. 4. It is assumed here that the charts for displaying each data element $D_i$ included in the determination information acquired from the event determination device 10 are the charts expressed by the nodes a to h shown in FIG. 4. In the example shown in FIG. 5, the value assigned to the node a based on the significance of the chart expressed by the node a is 10. Likewise, the value assigned to the node b is 2, the value assigned to the node c is 5, the value assigned to the node d is 5, the value assigned to the node e is 7, the value assigned to the node f is 5, the value assigned to the node g is 3, and the value assigned to the node h is 9.

When generating the directed graphs according to the value assigned to each node mentioned above, the directions from the node a to the node c and the node d, the direction from the node e to the node c, the direction from the node h to the node f, and the direction from the node f to the node g are set in the respective edges, as shown in FIG. 5.

In the case where two nodes at both ends of an edge are assigned the same value, the direction of the edge between the two nodes is not determined by the value. For instance, in the example shown in FIG. 5, the nodes c and d are both assigned the value of 5, so that the direction of the edge cannot be determined based on the value. In such a case, the direction between the nodes is set based on the chart order included in the definition information stored in the chart relevance definition holding unit 223. For example, suppose the nodes a to h shown in FIG. 4 and FIG. 5 are ordered alphabetically. The direction from the node c to the node d is then set in the edge between the nodes c and d, as shown in FIG. 5.

Next, the management screen editing unit 224 ranks the charts in each group (hereafter referred to as "relevant chart group") made up of the charts that are relevant to each other. Each directed graph generated in the above-mentioned manner has no closed path. Hence, by tracing the nodes of the directed graph in the order along the direction of each edge starting from the node whose indegree is 0, the nodes can be arranged sequentially. The set of charts expressed by the nodes included in the group of nodes sequentially arranged in this way is defined as a relevant chart group. Each chart in the relevant chart group is ranked according to the order of the nodes in the node group.

In the example of the directed graphs shown in FIG. 5, a node group I starting from the node a, a node group II starting from the node h, a node group III starting from the node e, and a node group IV starting from the node b are obtained. These node groups are in decreasing order of significance assigned to the starting node.

In the above-mentioned node groups, the nodes of the node group I are ordered as [a, c, d], the nodes of the node group II are ordered as [h, f, g], and the nodes of the node group III are ordered as [e, c, d]. The node group IV has no order because it is composed of only the single node b. Though the node sequence [a, d] starting from the node a is also possible in FIG. 5, this node sequence is not taken into consideration on the ground that it is included in the node group I.

In this embodiment, the relevance of each chart as the analysis screen is specified based on the definition information held in the chart relevance definition holding unit 223 beforehand. On the other hand, the significance of each chart is computed based on the contribution of the data elements included in the determination information acquired from the event determination device 10, as described above. Accordingly, each relevant chart group and the rank of each chart in the relevant chart group set in the above-mentioned manner differ depending on the event determined in the event determination device 10.

Exemplary Management Screen Editing

The management screen editing process is described next. The management screen editing unit 224 edits (generates) the management screen, with reference to the information of each relevant chart group and the rank of each chart in the relevant chart group set in the above-mentioned manner. In this embodiment, a notification screen (first management screen) for notifying the event that occurs (the event determined by the event determination device 10), a list screen (second management screen) for displaying a list of charts relating to the event, and an analysis screen (third management screen) for enlarged-displaying a chart are generated each as the management screen and switchingly displayed on the display device. Examples of specific structures of these screens are described below.

Figure 6:
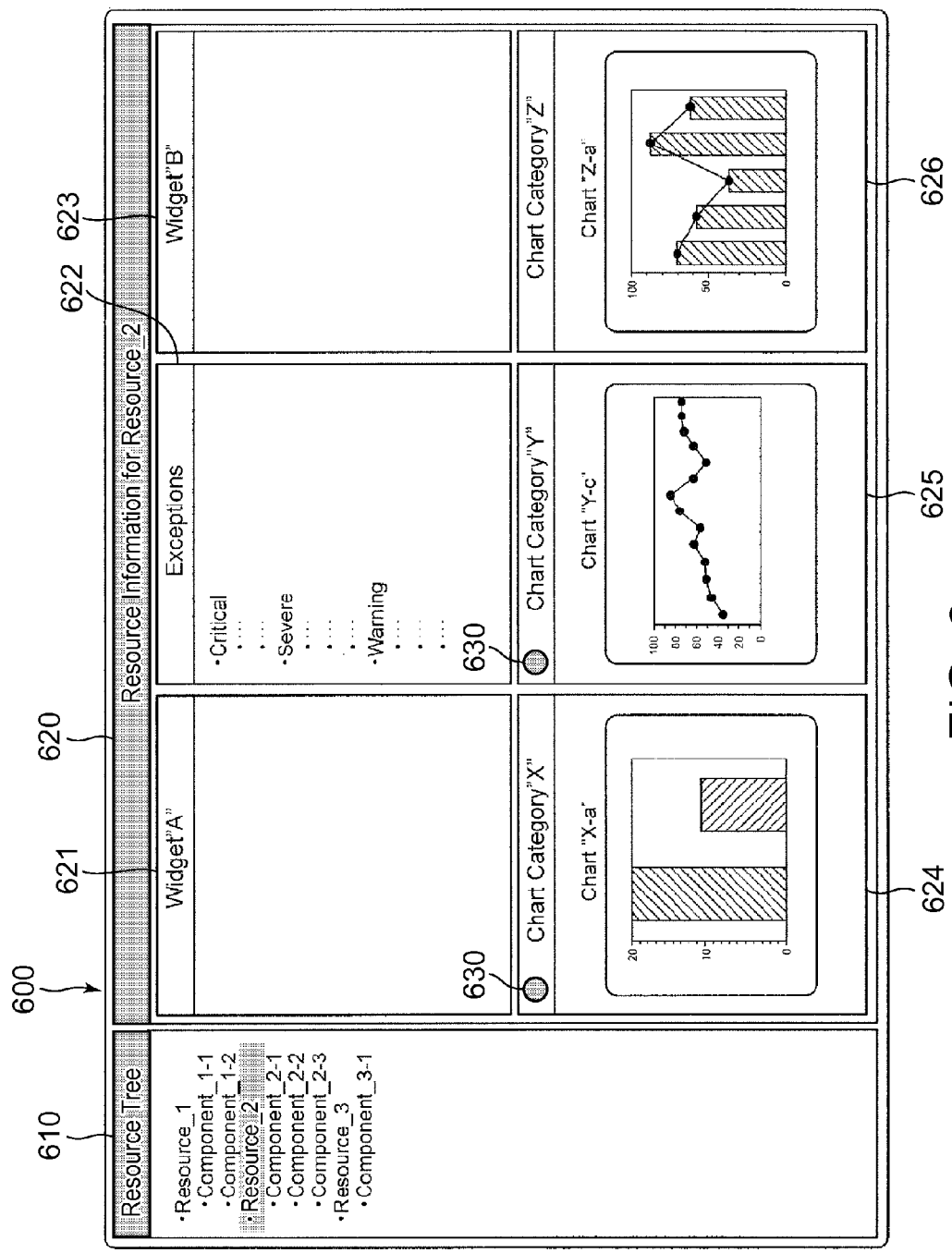
FIG. 6 is a diagram showing an example of a structure of a notification screen in the embodiment.

FIG. 6 is a diagram showing an example of a structure of the notification screen. A notification screen 600 shown in FIG. 6 includes information relating to the event (event that occurs) indicated by the determination information acquired from the event determination device 10, and a category guidance display for selecting a chart relating to the event. In FIG. 6, the notification screen 600 has a resource display field 610 ("Resource Tree" in the drawing) for displaying a list of resources to be managed, and a resource information field 620 for displaying resource-related information. In the resource display field 610, the resources to be managed are listed together with the configuration ("Component" in the drawing) of each resource.

In the resource information field 620, a total of six display areas 621 to 626, i.e. three display areas in each of the upper and lower tiers, are formed, and the event that occurs is listed in the upper middle display area 622. In the example shown in FIG. 6, the event that occurs is presented by classifying it according to severity ("Critical", "Severe", and "Warning"). The upper left and right display areas 621 and 623 ("Widget "A"" and "Widget "B""), which are blank in the example shown in FIG. 6, can be used to display appropriate information for use by the administrator, such as information about the specifications of the managed system.

A category guidance image is displayed in each of the lower display areas 624 to 626 in the resource information field 620. Suppose here that there are a plurality of charts expressing the states of the resources of the managed system depending on the specifications of the managed system, the types and number of resources, the methods and criteria for determining the states of the resources, and the like, and these charts are classified into several categories. In this embodiment, a chart representing each category is displayed in the corresponding one of the display areas 624 to 626 as the category guidance image. Of these areas, a special display 630 indicating that the category includes a significant chart is added in the display areas 624 and 625. The special display 630 will be described later. The charts expressing the states of the resources of the managed system are classified into three categories in the example shown in FIG. 6. In the case where there are more than three categories of charts, for example, a scroll bar may be provided on the right side of the notification screen 600 so that the display of each display area is moved by operating the scroll bar.

Note that FIG. 6 merely shows an example of the structure of the notification screen 600, and the present invention is not limited to the structure shown in the drawing. For example, the positions and display contents of the resource display field 610 and the resource information field 620 are not limited to those shown in the drawing. In particular, the arrangement and number of display areas in the resource information field 620 are not limited to the structure shown in the drawing, so long as it is possible to notify the event that occurs and present the charts relating to the event. For instance, though a total of six display areas are formed in the upper and lower tiers in the example of the structure shown in the drawing, the number of tiers is not limited to two, and the number of display areas aligned in one tier is not limited to three. Besides, the display form of the notification screen 600 is not limited to the dashboard.

Figure 7:
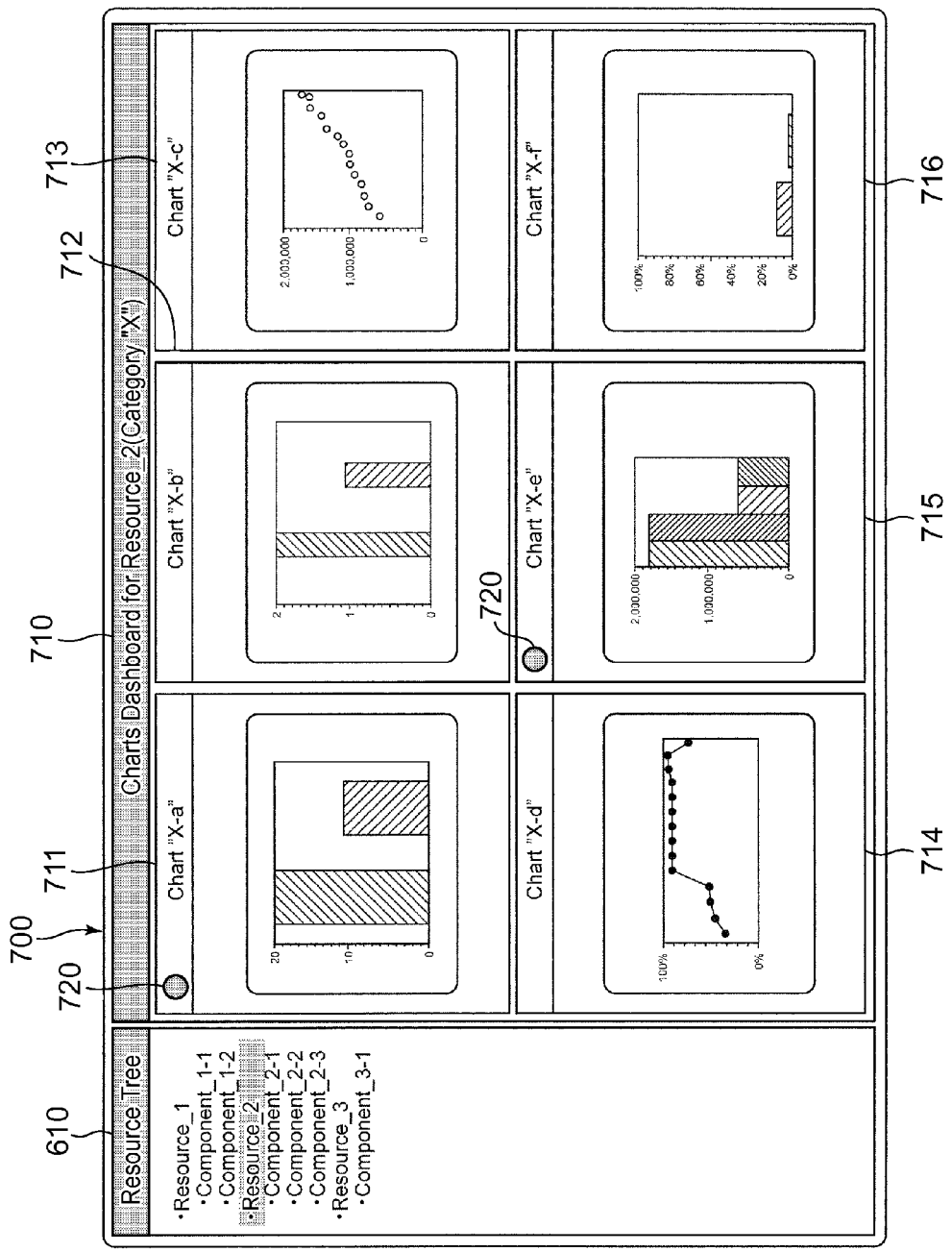
FIG. 7 is a diagram showing an example of a structure of a list screen in the embodiment.

FIG. 7 is a diagram showing an example of a structure of the list screen. A list screen 700 shown in FIG. 7 is a screen for displaying a list of charts belonging to the category selected in the notification screen 600 shown in FIG. 6. In FIG. 7, the list screen 700 has a list display field 710 for displaying the list of charts, in addition to the same resource display field 610 as in the notification screen 600. A total of six display areas 711 to 716, i.e. three display areas in each of the upper and lower tiers, are formed in the list display field 710, and each of a total of six charts is reduced-displayed in a different one of the display areas 711 to 716. Of these display areas, a special display 720 indicating that there is a chart relevant to the displayed chart is added in the display areas 711 and 715. The special display 720 will be described later. Six charts are displayed in the list display field 710 in the example shown in FIG. 7. In the case where there are more than six charts belonging to the selected category, for example, a scroll bar may be provided on the right side of the list screen 700 so that the display of each display area is moved by operating the scroll bar.

Note that FIG. 7 merely shows an example of the structure of the list screen 700, and the present invention is not limited to the structure shown in the drawing. For example, the positions and display contents of the resource display field 610 and the list display field 710 are not limited to those shown in the drawing. In particular, the arrangement and number of display areas in the list display field 710 are not limited to the structure shown in the drawing, so long as it is possible to display the charts belonging to the selected category in a list. For instance, though a total of six display areas are formed in the upper and lower tiers in the example of the structure shown in the drawing, the number of tiers is not limited to two, and the number of display areas aligned in one tier is not limited to three. Besides, the display form of the list screen 700 is not limited to the dashboard.

Figure 8:
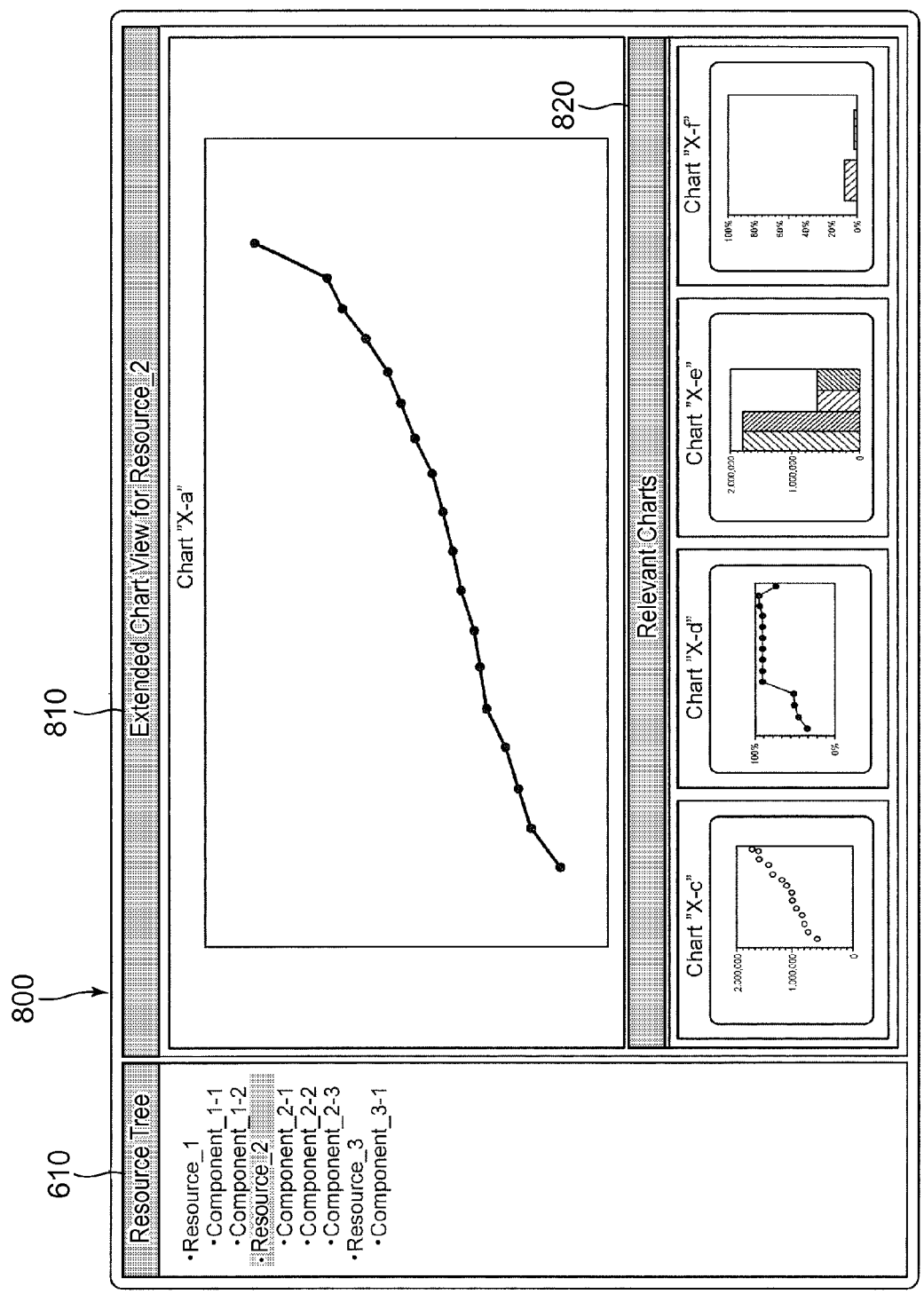
FIG. 8 is a diagram showing an example of a structure of an analysis screen in the embodiment.

FIG. 8 is a diagram showing an example of a structure of the analysis screen. An analysis screen 800 shown in FIG. 8 is a screen for displaying the chart selected in the list screen 700 shown in FIG. 7. In FIG. 8, the analysis screen 800 has a content display field 810 for displaying the chart in a larger display size (enlarged display) and a relevant chart display field 820 for displaying each chart relevant to the chart displayed in the content display field 810 in a smaller display size (reduced display), in addition to the same resource display field 610 as in the notification screen 600 and the list screen 700. Four charts are displayed in the relevant chart display field 820 in the example shown in FIG. 8. In the case where there are more than four charts relevant to the chart displayed in the content display field 810, for example, a scroll bar may be provided on the right side of the analysis screen 800 so that the display of each display area is moved by operating the scroll bar.

Note that FIG. 8 merely shows an example of the structure of the analysis screen 800, and the present invention is not limited to the structure shown in the drawing. For example, the positions and display contents of the resource display field 610, the content display field 810, and the relevant chart display field 820 are not limited to those shown in the drawing. Besides, the display form of the analysis screen 800 is not limited to the dashboard.

The management screen editing unit 224 generates the above-mentioned notification screen 600, list screen 700, and analysis screen 800 based on the instruction accepted via the operation acceptance unit 23, and switchingly displays the notification screen 600, the list screen 700, and the analysis screen 800 on the display device. In detail, first the administrator inputs an instruction for designating the managed system to be analyzed, using the input device. Upon accepting the instruction via the operation acceptance unit 23, the management screen editing unit 224 generates the notification screen 600 including the information relating to the designated managed system, and displays the notification screen 600 on the display device. Here, to determine the managed system which the administrator wants to analyze, the management information output control device 20 may, in the case of acquiring the determination information from the event determination device 10, notify the administrator of the managed system that is subjected to the determination in the acquired determination information. The means of notification may be display on the display device, sound output, or the like.

Exemplary Management Screen Generation Procedure

The following describes a specific procedure performed by the management screen editing unit 224 when generating each management screen described with reference to FIG. 6 to FIG. 8. The procedure of generating the notification screen 600 is described first. To generate the notification screen 600, the management screen editing unit 224 determines each chart (hereafter referred to as "representative chart") representing the corresponding category, which is to be displayed in the resource information field 620 of the notification screen 600, based on the significance of each chart and the rank of each chart in each relevant chart group described with reference to FIG. 5.

In detail, the management screen editing unit 224 first sets each relevant chart group in which the significance of the starting chart (i.e. the chart highest in significance in the group) exceeds a predetermined threshold from among the above-mentioned relevant chart groups, as a priority chart group. The management screen editing unit 224 also sets each chart, in the priority chart group, whose significance exceeds the threshold, as a priority chart. That is, at least one priority chart is included in every priority chart group.

The management screen editing unit 224 then sets, for each category displayed in the resource information field 620 of the notification screen 600, a chart highest in significance of the charts belonging to the category, as a representative chart. When displaying the notification screen 600 on the display device, the management screen editing unit 224 reduced-displays such a determined representative chart in a display area (one of the display areas 624 to 626 in the example shown in FIG. 6) to which the category corresponding to the representative chart is assigned.

Note that the categories are set for each managed system, separately from the relevance between the charts described with reference to FIG. 4. The charts belonging to each category, however, are charts indicating the states of the resources of the managed system for which the categories are set. Moreover, the charts constituting each relevant chart group are charts for displaying values for the data elements included in the determination information, and the determination information is information indicating the event that occurs in the managed system. Therefore, all or most of the charts constituting each relevant chart group belong to any of the categories.

The procedure of generating the list screen 700 is described next. When a specific category is selected in the notification screen 600, the management screen editing unit 224 switches the display of the display device from the notification screen 600 to the list screen 700, and displays, on the display device, the list display field 710 in which the charts belonging to the selected category are arranged. For example, the management screen editing unit 224 arranges the charts belonging to the selected category in decreasing order of significance (i.e. according to the ranking in the relevant chart group), from the upper left display area 711 in the list display field 710.

The procedure of generating the analysis screen 800 is described next. When a specific chart is selected in the list screen 700, the management screen editing unit 224 switches the display of the display device from the list screen 700 to the analysis screen 800, and enlarged-displays the selected chart in the content display field 810. If the selected chart is included in a relevant chart group, the management screen editing unit 224 reduced-displays the other chart(s) included in the relevant chart group, in the relevant chart display field 820. In the case where there are a plurality of relevant charts, for example, the charts are arranged in decreasing order of significance. Only the charts lower in significance than the chart displayed in the content display field 810 may be displayed in the relevant chart display field 820. As an alternative, only the charts included in the same relevant chart group as the chart displayed in the content display field 810 and belonging to a different category from the chart displayed in the content display field 810 may be displayed in the relevant chart display field 820. As another alternative, only the charts included in the same relevant chart group as the chart displayed in the content display field 810 and belonging to the same category as the chart displayed in the content display field 810 may be displayed in the relevant chart display field 820.

Exemplary Addition of Special Display

The following describes the addition of the special display in this embodiment. In this embodiment, the management screen editing unit 224 performs the special display 630 in the notification screen 600 and the special display 720 in the list screen 700, as described with reference to FIG. 6 and FIG. 7.

In the notification screen 600, the special display 630 is added in each display area (the display areas 624 and 625 in the example in FIG. 6) in which a representative chart of a category including a priority chart (chart whose significance exceeds the threshold) is displayed. Though a mark (D) simply indicating that the category is important is displayed in the display areas 624 and 625 as the special display 630 in the illustrated example, the display mode of the special display 630 is not limited to the illustrated mode. For example, the display may include various information such as the number of priority charts belonging to the category to which the special display 630 is added.

In the list screen 700, the special display 720 is added in each display area (the display areas 711 and 715 in the example in FIG. 7) in which, of the charts displayed in the list, a chart whose relevant charts are to be displayed in the relevant chart display field 820 when the chart is enlarged-displayed in the analysis screen 800 is displayed. Though a mark (D) simply indicating that there are one or more relevant charts is displayed in the display areas 711 and 715 as the special display 720 in the illustrated example, the display mode the special display 720 is not limited to the illustrated mode. For example, the display may include various information such as the number of charts to be displayed in the relevant chart display field 820 when enlarged-displaying the chart provided with the special display 720 in the analysis screen 800, a symbol associated with the event that occurs in the managed system, and the like.

Exemplary Operation of Management Information Output Control Device

Figure 9:
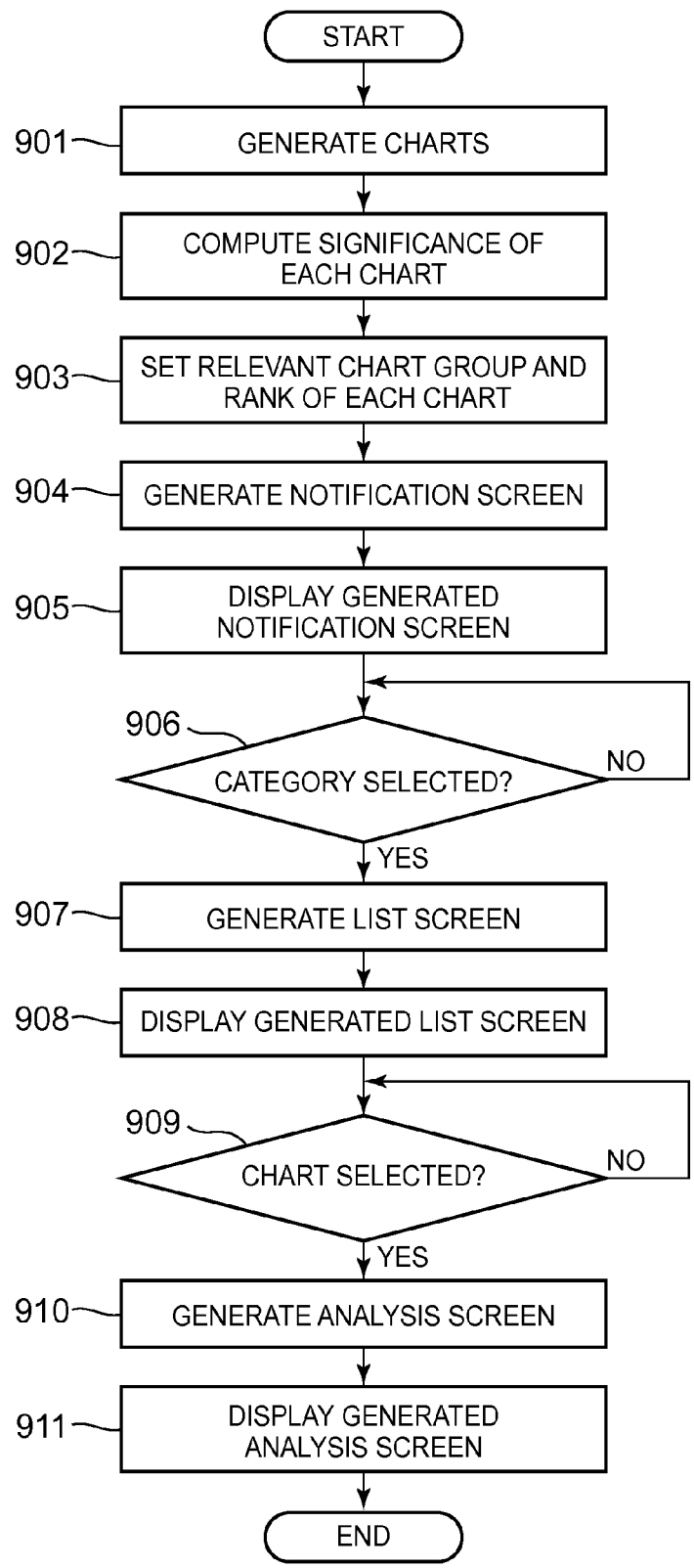
FIG. 9 is a flowchart showing overall operation flow of a management information output control device in the embodiment.

FIG. 9 is a flowchart showing overall operation flow of the management information output control device 20 in this embodiment. As shown in FIG. 9, the management screen generation unit 22 in the management information output control device 20 in this embodiment generates the charts for displaying the management information based on the definition information held in the chart generation definition holding unit 221, using the determination information acquired from the event determination device 10 and the management information (data element values) acquired from the management information storage device 30 (step 901).

The management screen generation unit 22 then computes the significance of each chart generated in step 901, based on the weight of each data element included in the determination information (step 902). The management screen generation unit 22 sets each relevant chart group and the rank of each chart in the relevant chart group using the definition information held in the chart relevance definition holding unit 223, based on the significance computed in step 902 (step 903).

Next, the management screen generation unit 22 generates the notification screen 600 relating to the selected managed object, according to the managed object selection operation performed by the administrator and accepted by the operation acceptance unit 23 (step 904). In the generated notification screen 600, the chart to be displayed as the category guidance screen is selected and the special display 630 is added depending on the chart belonging to the category, based on the significance computed in step 902 and the rank of each chart set in step 903. The display control unit 24 displays the generated notification screen 600 on the display device (step 905).

When the operation acceptance unit 23 accepts the category selection operation by the administrator, the management screen generation unit 22 generates the list screen 700 relating to the selected category (steps 906 and 907). In the generated list screen 700, the special display 720 is added to each chart, from among the charts displayed in the list, to which one or more charts are relevant, based on the relevant chart group and the rank of each chart set in step 903. The display control unit 24 displays the generated list screen 700 on the display device (step 908).

When the operation acceptance unit 23 accepts the chart selection operation by the administrator, the management screen generation unit 22 generates the analysis screen 800 in which the selected chart is displayed in the content display field 810 (steps 909 and 910). In the case where one or more charts are relevant to the selected chart based on the relevant chart group set in step 903, the relevant charts are displayed in the relevant chart display field 820. The display control unit 24 displays the generated analysis screen 800 on the display device (step 911).

Exemplary Hardware Structure

Figure 10:
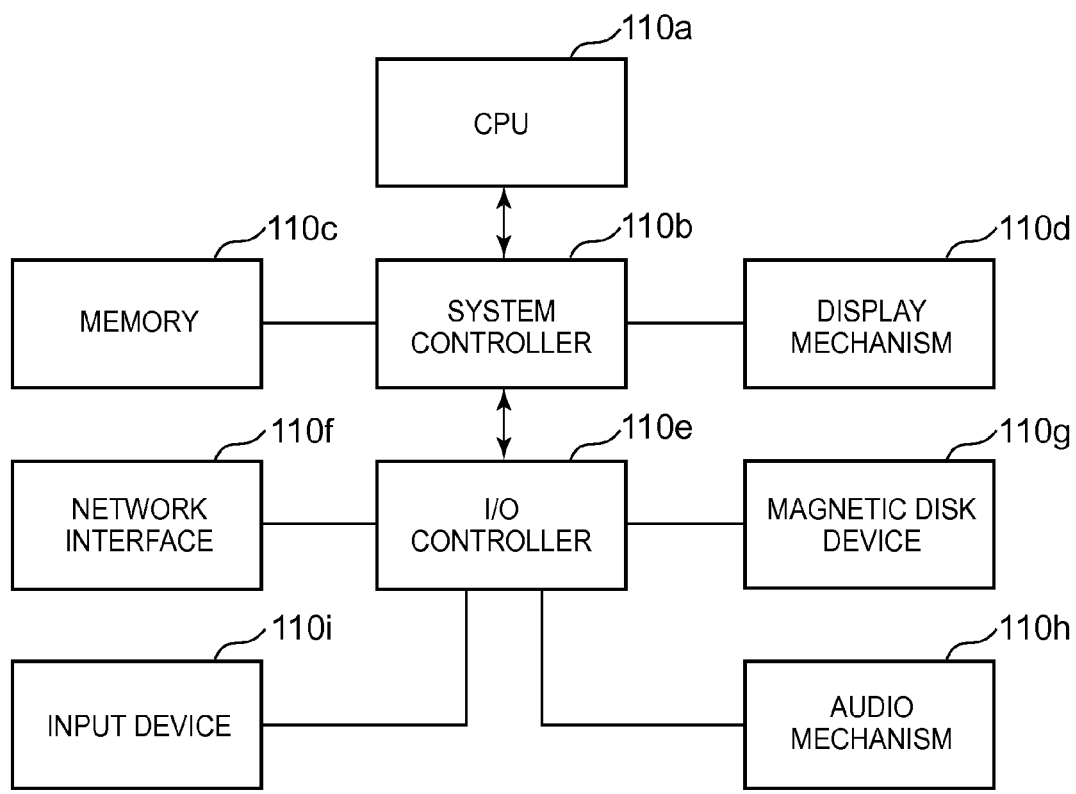
FIG. 10 is a diagram showing an example of a hardware structure of a computer preferable for implementing an event determination device and the management information output control device in the embodiment.

FIG. 10 is a diagram showing an example of a hardware structure of a computer preferable for implementing the event determination device 10 and the management information output control device 20 in this embodiment. The computer shown in FIG. 10 includes a CPU (Central Processing Unit) 110a which is computing means, and a memory 110c which is main storage means. The computer also includes a magnetic disk device (HDD: Hard Disk Drive) 110g, a network interface 110f, a display mechanism 110d, an audio mechanism 110h, an input device 110i such as a keyboard and a mouse, and the like, as external devices.

In the example of the structure shown in FIG. 10, the memory 110c and the display mechanism 110d are connected to the CPU 110a via a system controller 110b. The network interface 110f, the magnetic disk device 110g, the audio mechanism 110h, and the input device 110i are connected to the system controller 110b via an I/O controller 110e. The components are connected by various buses such as a system bus and an input/output bus.

Note that FIG. 10 merely shows an example of the hardware structure of the computer preferable for applying this embodiment. This embodiment is not limited to the implementation by the structure shown in the drawing, and is widely applicable to any system that manages resources of a managed system, determines whether or not a specific event occurs, and outputs management information based on the result of determination.

In FIG. 10, programs such as an OS and application software are stored in the magnetic disk device 110g. The function of the determination unit 12 in the event determination device 10, the functions of the operation acceptance unit 23 and the display control unit 24 in the management information output control device 20, and the functions of the management information processing unit 222 and the management screen editing unit 224 in the management screen generation unit 22 are realized by the CPU 110a reading these programs into the memory 110c and executing the programs. Moreover, the determination rule holding unit 11 in the event determination device 10 and the chart generation definition holding unit 221 and the chart relevance definition holding unit 223 in the management screen generation unit 22 in the management information output control device 20 are realized by the storage means such as the magnetic disk device 110g and the memory 110c. Furthermore, the determination information transmission unit 13 in the event determination device 10 and the determination information reception unit 21 in the management information output control device 20 are realized by the network interface 110f and the like.

Though the event determination device 10, the management information output control device 20, and the management information storage device 30 are shown as separate devices in FIG. 1 as the example of the system structure in this embodiment, this embodiment is not limited to the illustrated system structure. For example, the event determination device 10 and the management information output control device 20 may be implemented by a single computer. Further, the management information storage device 30 may be implemented by the same computer.

The operation acceptance unit 23 and the display control unit 24 in the management information output control device 20 shown in FIG. 1 may be separated from the management screen generation unit 22 and implemented by separate hardware. A specific example of this is that a mobile information terminal such as a tablet terminal or a smartphone having the functions of the operation acceptance unit 23 and the display control unit 24 accesses a server having the function of the management screen generation unit 22. In such a case, the mobile information terminal acquires the management screen generated by the management screen generation unit 22 in the server, displays the management screen on the display device by the function of the display control unit 24, and accepts the operation on the input device such as a touch panel by the function of the operation acceptance unit 23.

In the case of event logging and management where, through the use of such a management system, the administrator of the managed object system (herein referred to as "managed system") tries to handle an event that occurs in the managed system, the administrator normally needs to have skills to efficiently reference to the management information provided from the management system and appropriately handle the event. To enable even a non-expert to appropriately handle the event, a manual or a guide is prepared to offer advice on specific handling methods for possible events. It is, however, difficult to assume all possible events beforehand and completely cover handling methods for the possible events. Besides, for example in the case where a plurality of events occur, the amount of information to be referenced to increases, making it difficult for the non-expert to determine how to reference to the management information provided from the management system.

In view of these problems, the present invention has an object of providing information in more convenient way according to an event that occurs in a managed system, thus enabling efficient reference to management information regardless of an administrator's skill level.

To achieve the object stated above, the present invention is realized in one embodiment as the following device. The device is a device for outputting management information relating to an event that occurs in a managed object, and includes: a management information processing unit for generating, based on the event that occurs in the managed object, charts for displaying the management information relating to the event; a management screen editing unit for generating a management screen for managing a state of the managed object using the charts generated by the management information processing unit; and a display control unit for displaying the management screen generated by the management screen editing unit, on a display device. The management screen editing unit: sets significance of each of the charts generated by the management information processing unit, based on weight information of the management information referenced to for determining the occurrence of the event, the weight information being weight information of the management information in the determination; generates at least a first management screen for selecting one of a plurality of chart groups relating to the event that occurs and a second management screen for displaying the chart group selected in the first management screen; and performs, in the first management screen, a special display for a chart group that includes a chart whose significance is higher than a predetermined threshold, to distinguish the chart group from other chart groups.

In one embodiment of the present invention and described herein, the device further includes a holding unit for holding relevance definition information defining relevance between the charts generated by the management information processing unit. The management screen editing unit performs a special display for a chart, from among charts included in the chart group displayed in the second management screen, to which one or more charts are relevant based on the relevance definition information, to distinguish the chart from other charts.

In one embodiment of the present invention and described herein, the special display in the first management screen includes a display of information of the number of charts whose significance is higher than the predetermined threshold in the chart group for which the special display is performed. Moreover, the special display in the second management screen includes a display of information of the number of charts relevant to the chart for which the special display is performed.

Further preferably In one embodiment of the present invention and described herein screen that includes: a display area for displaying, in a larger display size, the chart selected in the second management screen; and a display area for displaying, in a smaller display size, one or more charts relevant to the selected chart based on the relevance definition information.

In one embodiment of the present invention and described herein the management screen editing unit displays, as a guidance image for selecting the chart group relating to the event that occurs in the managed object, a chart whose significance is highest of charts belonging to the chart group, in the first management screen.

In one embodiment and described herein, the present invention is also realized as a method for causing a computer to output management information relating to an event that occurs in a managed object. The method includes the steps of: generating, based on the event that occurs in the managed object, charts for displaying the management information relating to the event that occurs, according to predetermined definition information; setting significance of each of the generated charts, based on weight information of the management information referenced to for determining the occurrence of the event, the weight information being weight information of the management information in the determination; generating a first management screen for selecting one of a plurality of chart groups relating to the event that occurs, the first management screen being a screen in which a special display is added to distinguish a chart group out of the plurality of chart groups that includes a chart whose significance is higher than a predetermined threshold, from other chart groups; and generating a second management screen for displaying the chart group selected in the first management screen.

In one embodiment of the present invention and described herein, in the step of generating the second management screen, a special display is performed for a chart, from among charts included in the chart group displayed in the second management screen, to which one or more charts are relevant based on preset relevance definition information defining relevance between the charts, to distinguish the chart from other charts.

The present invention is further realized as a program for controlling a computer to realize each function of the above-mentioned device, or a program for causing a computer to execute the process corresponding to each step in the above-mentioned method. Such a program may be provided by being stored in a recording medium such as a magnetic disk, an optical disk, a semiconductor memory, or the like and distributed, or by being distributed via a network.

According to the present invention, it is possible to provide information in more convenient way according to an event that occurs in a managed system, thus enabling efficient reference to management information regardless of an administrator's skill level.

Various other changes and modifications made to the embodiment described above are also included in the technical scope of the present invention.

The invention claimed is:

1. A hardware device for outputting management information relating to an event that occurs in a managed object, the hardware device comprising:

a management information processing unit for generating, based on the event that occurs in the managed object, charts for displaying the management information relating to the event;

a management screen editing unit for generating a management screen for managing a state of the managed object using the charts generated by the management information processing unit; and a display control unit for displaying the management screen, generated by the management screen editing unit, on a display device, wherein the management screen editing unit:
- sets significance of each of the charts generated by the management information processing unit, based on weight information of the management information referenced to for determining an occurrence of the event, the weight information being weight information of the management information;
- generates at least a first management screen for selecting one of a plurality of chart groups relating to the event that occurs in the managed object;
- generates a second management screen for displaying a chart group selected in the first management screen; and
- provides, in the first management screen, a special display for a particular chart group that includes a chart whose significance is higher than a predetermined threshold, to distinguish the particular chart group from other chart groups.

2. The hardware device according to claim 1, further comprising a holding unit for holding relevance definition information defining relevance between the charts generated by the management information processing unit, wherein the management screen editing unit provides a special display for a particular chart, from among charts included in a chart group displayed in the second management screen, to which one or more charts are relevant based on the relevance definition information, to distinguish the particular chart from other charts.

3. The hardware device according to claim 1, wherein the special display in the first management screen includes a display of information describing a quantity of charts whose significance is higher than the predetermined threshold in the chart group for which the special display is provided.

4. The hardware device according to claim 1, wherein the special display in the second management screen includes a display of information describing of a quantity of charts relevant to a chart for which the special display is provided.

5. The hardware device according to claim 2, wherein the management screen editing unit further generates a third management screen that includes:
- a display area for displaying, in a larger display size, a chart selected in the second management screen; and
- a display area for displaying, in a smaller display size, one or more charts relevant to the chart selected in the second management screen based on the relevance definition information.

6. The hardware device according to claim 1, wherein the management screen editing unit displays, as a guidance image for selecting a chart group related to an event that occurs in the managed object, a chart whose significance is highest of charts belonging to the chart group related to the event that occurs in the managed object, wherein the guidance image is displayed in the first management screen.

7. A hardware device for outputting management information relating to an event that occurs in a managed object, the hardware device comprising:

a management information processing unit for generating, based on the event that occurs in the managed object, charts for displaying the management information relating to the event;

a holding unit for holding relevance definition information defining relevance between the charts generated by the management information processing unit;

a management screen editing unit for generating a management screen for managing a state of the managed object using the charts generated by the management information processing unit; and a display control unit for displaying the management screen generated by the management screen editing unit, on a display device, wherein the management screen editing unit:
- sets significance of each of the charts generated by the management information processing unit, based on weight information of the management information referenced to for determining an occurrence of the event, the weight information being weight information of the management information;
- generates a first management screen, a second management screen, and a third management screen, the first management screen being a screen in which a guidance image for selecting one of a plurality of chart groups relating to the event that occurs in the managed object is included and in which a chart whose significance is highest of charts belonging to the chart group is displayed as the guidance image, the second management screen being a screen for displaying the chart group selected in the first management screen, and the third management screen being a screen for displaying, in a larger display size, a chart selected in the second management screen and displaying, in a smaller display size, one or more charts relevant to the chart based on the relevance definition information;
- performs, in the first management screen, a first special display for a chart group that includes a chart whose significance is higher than a predetermined threshold, to distinguish the chart group from other chart groups; and
- performs a second special display for a chart, from among charts included in the chart group displayed in the second management screen, to which one or more charts are relevant based on the relevance definition information, to distinguish the chart from other charts.

8. The hardware device according to claim 7, wherein the first special display in the first management screen includes a display of information describing a quantity of charts whose significance is higher than the predetermined threshold in the chart group for which the first special display is performed.

9. The hardware device according to claim 7, wherein the second special display in the second management screen includes a display of information describing of a quantity of charts relevant to a chart for which the second special display is performed.

10. The hardware device according to claim 8, wherein the management screen editing unit further generates a third management screen that includes:
- a display area for displaying, in a larger display size, a chart selected in the second management screen; and a display area for displaying, in a smaller display size, one or more charts relevant to the chart selected in the second management screen based on the relevance definition information.

11. The hardware device according to claim 7, wherein the management screen editing unit displays, as a guidance image for selecting a chart group related to an event that occurs in the managed object, a chart whose significance is highest of charts belonging to the chart group related to the event that occurs in the managed object, wherein the guidance image is displayed in the first management screen.

12. A computer program product for causing a computer to output management information relating to an event that occurs in a managed object, the computer program product comprising a computer readable storage medium having program code embodied therewith, the program code readable and executable by a processor to perform a method comprising:

generating, based on the event that occurs in the managed object, charts for displaying the management information relating to the event, according to predetermined definition information;

setting significance of each of the charts generated in the step of generating the charts, based on weight information of the management information referenced to for determining an occurrence of the event, the weight information being weight information of the management information;

generating a first management screen for selecting one of a plurality of chart groups relating to the event that occurs in the managed object, the first management screen being a screen in which a special display is added to distinguish a chart group out of the plurality of chart groups that includes a chart whose significance set in the step of setting the significance is higher than a predetermined threshold, from other chart groups; and generating a second management screen for displaying the chart group selected in the first management screen.

13. The computer program product according to claim 12, wherein, in said generating the second management screen, a special display is performed for a chart, from among charts included in the chart group displayed in the second management screen, to which one or more charts are relevant based on preset relevance definition information defining relevance between the charts, to distinguish the chart from other charts.

14. The computer program product according to claim 12, wherein the special display in the first management screen includes a display of information describing a quantity of charts whose significance is higher than the predetermined threshold in the chart group for which the special display is performed.

15. The computer program product according to claim 12, wherein the special display in the second management screen includes a display of information describing of a quantity of charts relevant to a chart for which the special display is performed.

* * * * *